April 6, 1937. W. H. KNISKERN 2,076,033
PHTHALIC ANHYDRIDE RECOVERY
Filed Dec. 31, 1934
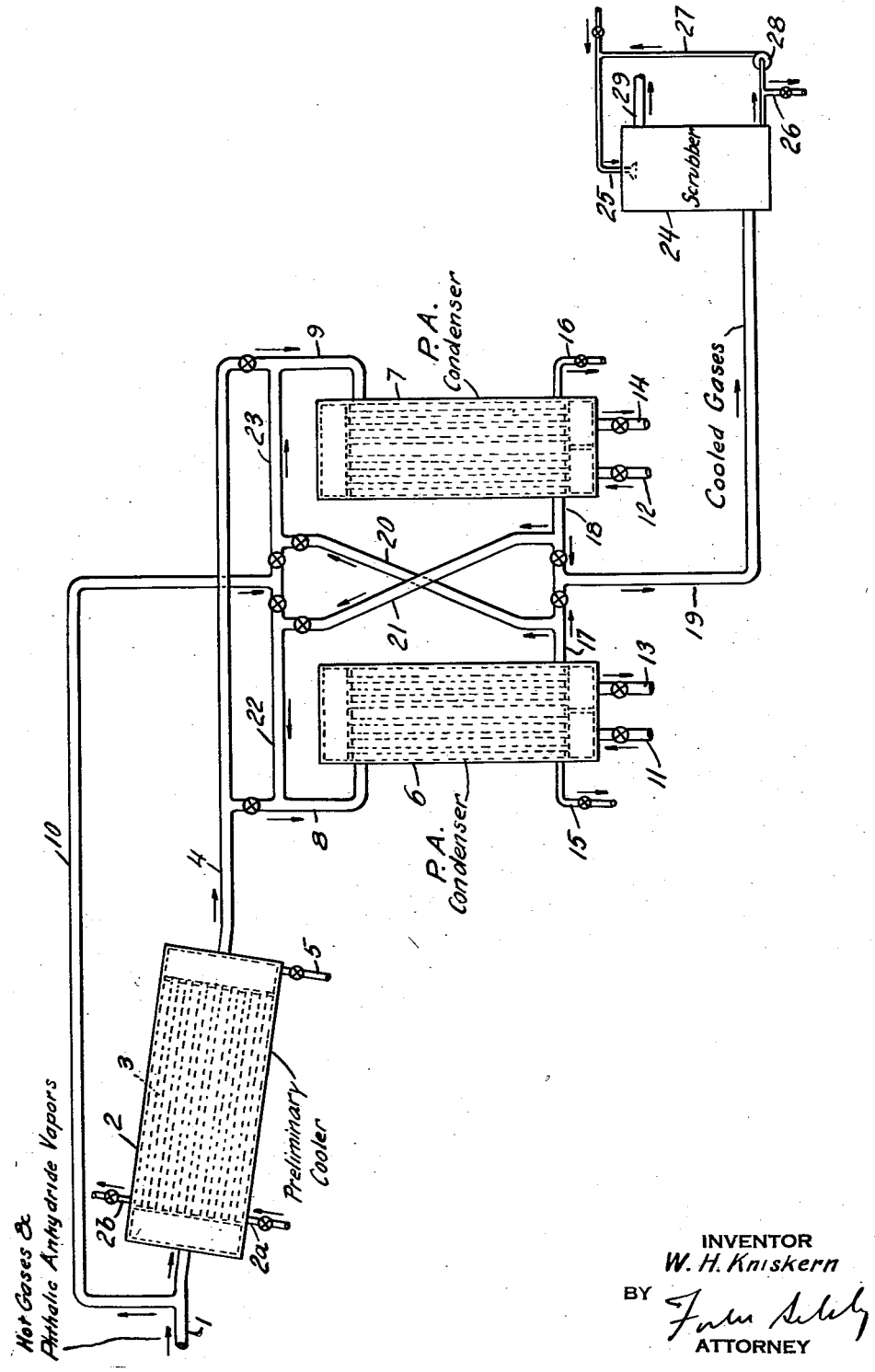
INVENTOR
W. H. Kniskern
BY
ATTORNEY Patented Apr. 6, 1937

2,076,033

UNITED STATES PATENT OFFICE 2,076,033

PHTHALIC ANHYDRIDE RECOVERY

Walter H. Kniskern, Petersburg, Va., assignor, by mesne assignments, to The Solvay Process Company, New York, N. Y., a corporation of New York Application December 31, 1934, Serial No. 759,970

3 Claims. (Cl. 260—123)

This invention relates in general to the partial oxidation of hydrocarbons. It is particularly directed to improvements in recovery of phthalic anhydride obtained by catalytic oxidation of polynuclear aromatic compounds, for instance naphthalene, anthracene, naphthoquinone, or an alkyl-naphthalene wherein one ring contains one or more alkyl groups.

The invention has for its object reduction of health hazards and improvement in the efficiency of operation of phthalic anhydride recovery apparatus.

In the ordinary synthesis of phthalic anhydride by the catalytic oxidation of naphthalene, a mixture of naphthalene vapor and air in a weight ratio of 25 to 35 parts of air for one part of naphthalene (representing a molar or volume ratio of naphthalene to total gas from about 1:110 to 1:160) is passed into a catalytic converter at a temperature of 200° to 350° C. wherein it is brought into intimate contact with a bed of a solid oxidation catalyst, for example vanadium oxide, distributed on a suitable carrier. The ensuing oxidation reaction causes a rapid temperature rise and the catalyst bed and gases passing therethrough are accordingly cooled in some manner sufficiently so that a temperature between 475° and 600° C. is maintained in the converter. By this passage through the catalyst bed the naphthalene is oxidized mainly to phthalic anhydride; other products, for example maleic acid, naphthoquinone, coumarin, carbon dioxide, water, and usually traces of tarry matter also being produced in some degree.

The reaction product, comprising the above-mentioned constituents in vapor or gaseous phase, nitrogen, and excess oxygen, passes from the converter at a high temperature, say between 500° and 550° C. This hot product is conveyed through a cooler or series of coolers in which its temperature is sufficiently reduced to cause condensation of phthalic anhydride in solid phase. After condensation of phthalic anhydride, the remaining gases may be scrubbed to eliminate maleic anhydride fumes. They are then normally expelled to the atmosphere.

As at present carried out, the phthalic anhydride condensation is effected in large chambers, the exterior surfaces of which are exposed to the air to cause the requisite cooling. The phthalic anhydride collects on the inner surfaces of the walls of the chambers as solid crystalline incrustations. Periodically the condensers are shut down and the phthalic anhydride is removed by workmen, who must enter the chambers in order to free the walls of the chambers from the deposits of incrusted phthalic anhydride crystals. Not only do the cooling chambers occupy a large volume of placement space, but the fumes within the chambers and to which the workmen are exposed are of an extremely noxious character and highly irritating to the mucous membranes so that the cleaning operation is not only a noisome process, but is hazardous to the health of the workmen. Furthermore, upon opening the chambers for cleaning, some of the fumes escape and these escaping fumes may render an entire building temporarily uninhabitable.

In accordance with the present invention, the condensation of phthalic anhydride is effected in such a manner that its manual removal from the condensers is avoided. This makes possible a very great reduction in health hazards and greatly improved working conditions in the neighborhood of the plant.

In order that these results may be accomplished, I provide a condenser for the phthalic anhydride of such a type that it may be periodically heated to melt phthalic anhydride therein and the phthalic anhydride may be removed from the condenser in the form of a liquid. The liquid phthalic anhydride will readily flow from the condenser and as such may be conveyed directly to phthalic anhydride stills for effecting its further purification.

My condensation process is applicable to catalytic oxidation systems operating either in the normal manner as previously described, or under various other conditions. The process is not dependent upon the proportion of phthalic anhydride in the gaseous products and hence is applicable to systems using molar ratios of naphthalene vapor to air of 1:130 or higher or lower ratios. Likewise, it is applicable to systems operating under normal, elevated, or reduced pressures.

Since the gases normally leave the catalytic converter at a temperature very much in excess of that at which phthalic anhydride condenses as a solid, it is advantageous to provide a preliminary cooler for reducing the temperature of the gases to a point only slightly above the melting point of the phthalic anhydride. This cooler may have no other function than reduction of temperature of the gases or under certain regulated conditions of pressure and phthalic anhydride concentration, it may serve to condense a portion of the phthalic anhydride product in liquid phase as described more fully in U. S. application, Serial No. 759,969, filed of even date herewith by Donald A. Rogers.

Whether the preliminary cooler acts as a condenser for liquid phthalic anhydride or not, or whether it is entirely omitted, the general phthalic anhydride condensation process of the present invention is the same. Then too condensation of liquid phthalic anhydride may take place in the same condenser in which solid phthalic anhydride is recovered and it will be understood that such operation is included within the scope of the present invention.

The intermittent heating of the phthalic anhydride condenser in order to melt the solid phthalic anhydride which it contains may be effected in any convenient manner and by any desired heating medium, for example, steam, hot air, or hot combustion gases; or other hot gases or hot liquids may be employed for the purpose; or electrical, resistance or induction heating means may be employed.

In its preferred aspects the invention involves the use of the hot reaction gases themselves for supplying at least a part of the heat required for melting phthalic anhydride. While intermittent operation may be secured by means of a single condenser, I prefer, in order to obtain continuous operation of the recovery system, to employ a pair of condensers acting alternately; thus one of the condensers may be employed for condensing phthalic anhydride at the same time that the other condenser is being heated to effect phthalic anhydride liquefaction and removal.

In order that my invention may be more fully understood, the following description is given in connection with the accompanying drawing which shows somewhat schematically one embodiment of apparatus for carrying out the invention.

In the drawing numeral 1 indicates the conduit leading from the usual catalytic converter (not shown) to preliminary cooler 2. This preliminary cooler may be of any suitable type of construction. It advantageously may be a waste heat boiler for the generation of steam to be used elsewhere in the plant. In the drawing it is shown as a tubular interchanger provided with a cooling water inlet 2a and a steam outlet 2b. The central section contains tubes 3, arranged so that they are surrounded by the cooling medium and so that hot gases entering one end of the cooler through conduit 1 pass through the tubes to the other end of the cooler and out through conduit 4. A valved outlet 5 may be provided for the removal of any liquid condensate formed by cooling of the gases in the cooler 2. Conduit 4 leads from the gas exit end of the preliminary cooler 2 to condensers 6 and 7 through branch conduits 8 and 9. A conduit 10 also leads to these condensers directly from conduit 1, thus bypassing the preliminary cooler 2.

Condensers 6 and 7 may be of any suitable type and are illustrated as tubular, indirect heat exchangers having inlets 11 and 12 for cooling fluid and outlets 13 and 14 therefor. The condensers have valved outlets 15 and 16 for removal of liquid phthalic anhydride and gas exit conduits 17 and 18 leading to the common tail gas withdrawal conduit 19. The condensers are arranged for either parallel or series flow of gases and for this purpose conduits 20 and 21 are provided. Each of the conduits 8, 9, 17, 18, 20, and 21 is provided with a valve so that the flow of gases may be controlled to provide flow of gas from conduit 4 through either of the condensers or both in series or parallel. The branch conduits 22 and 23 connecting conduit 10 with the condensers also are provided with valves so that flow of hot gases from conduit 10 may be directed through the condensers either simultaneously with gas from conduit 4 or alternately therewith. Conduit 19 leads to a scrubber 24 having a spray head 25 and an outlet 26 for scrubbing fluid. Pipe 27 and a pump 28 are provided for recirculating the scrubbing fluid. Scrubber 24 may be of any convenient construction such as a scrubbing tower either containing packing, for instance ceramic material or free from packing. Outlet conduit 29 may exhaust to a suitable stack or directly to the atmosphere.

It will be understood that many mechanical details, for instance insulation or steam jackets for connecting-pipes or for units of the apparatus, suitable provision for avoiding stoppages, regulating temperatures, and automatically operating control valves all fall within the knowledge of the skilled chemical engineer and hence specific reference to such details has been omitted.

The following example serves to illustrate the operation of this apparatus for recovery of phthalic anhydride produced by catalytic oxidation of naphthalene with air in the usual manner. Reaction gases from the catalytic converter, while yet at a temperature in the neighborhood of 450° C., pass through conduit 1 into preliminary cooler 2, where they are cooled by indirect heat exchange with water to a temperature of about 135° C. With operation of cooler 2 under the pressures normally employed, no substantial condensation of liquid phthalic anhydride takes place in this cooler; at materially higher pressures than normal some phthalic anhydride will condense in liquid form and may be withdrawn through outlet 5. The cooling water in cooler 2 is preferably maintained under pressure so that its boiling point is maintained above the melting point of phthalic anhydride. By operating the cooler as a waste heat boiler for generation of steam, the walls of the cooler may be maintained above the melting point of phthalic anhydride and local overcooling and solidification of phthalic anhydride thereon may be avoided. The gases, still at a temperature above the melting point of phthalic anhydride, are passed through conduit 4 and branch conduit 8 into condenser 6.

In condenser 6 a cooling fluid, for instance water, is introduced at 11. This cooling fluid passes up through the tubes of the cooling section on the left hand side of the condenser, down through those on the right hand side, and out at 13. The gases are thus cooled in the condenser 6 to a temperature of about 60° C. so that phthalic anhydride separates out upon the exterior surfaces of the condenser tubes as a solid product. The gases pass out from condenser 6 through branches 17 and 20 to condenser 7, down through this condenser where any remaining phthalic anhydride is removed, and out through conduit 18 to conduit 19.

The gases now at a temperature only slightly above atmospheric, say about 30° to 40° C., enter scrubber 24 where they are scrubbed with cold water which is introduced at 25 and which washes out any remaining traces of phthalic anhydride and also maleic anhydride, small amounts of which are normally present in the gases. The gases leave scrubber 24 by way of conduit 29.

After the gases have passed through preliminary cooler 2 and condenser 6 for a substantial period of time, the quantity of solid phthalic anhydride in condenser 6 represents a considerable accumulation and in order to maintain the high efficiency of the cooling system, it is desirable to remove this product. Accordingly the valve on conduit 8 is closed and the valve on conduit 9 is opened so that gases pass from conduit 4 through conduit 9, condenser 7, and branch conduit 18 to conduit 19. The regulating valve on branch 22 is now opened somewhat to permit a portion of the gases from conduit 1 to bypass the preliminary cooler 2 by means of pipe 10 and enter directly into condenser 6. These gases may be at a temperature between 200° and 450° C. or higher, depending upon the cooling taking place in their travel from the converter.

The quantity of hot gas introduced through conduits 10 and 22 is preferably so regulated that it passes through condenser 6 without being cooled below the melting point of phthalic anhydride and thus raises the temperature of the phthalic anhydride deposit gradually to the melting point. The temperature of the condenser walls at the gas outlet may rise to around 135° C. and the temperature of the walls may rise somewhat higher near the gas inlet. However, at the beginning of passage of hot gas through the condenser, the cooling effect of the cold walls may be such as to lower the temperature of the gas below the condensation temperature of phthalic anhydride. This effect is not serious and is rapidly overcome as the walls of the condenser become warm. Circulation of cooling water through the condenser is of course discontinued during this step. Steam may be introduced into the portion of the condenser previously occupied by cooling fluid in order to assist in rapidly raising the temperature of the tubes. The valve on line 17 is still closed and the valve on branch 20 is still open so that gases from condenser 6 pass into condenser 7 and are further cooled therein along with gases entering from conduit 4 for condensation of phthalic anhydride therefrom. Liquid phthalic anhydride is withdrawn from condenser 6 through valved outlet 15 during the liquefaction period, for instance during the later part of this period.

There may be some phthalic acid accumulated in condenser 6 and accordingly, after the melting of phthalic anhydride, it may be desirable to further raise the temperature of the condenser for a short time to effect the decomposition of phthalic acid, the decomposition temperature of which is considerably higher than the melting point of phthalic anhydride. For this purpose the circulation of steam through the cooling section of condenser 6 may be discontinued unless a relatively high pressure steam is being employed. It will be noted that while ordinary steam at a temperature around 100° C. serves to some extent as a heating medium during the early portion of the condenser heating period, it serves as a cooling fluid as the temperature becomes elevated. The decomposition of phthalic acid is preferably effected during the later part of the melting step or immediately after, and the circuit arrangement of the condensers is not changed except with respect to control of steam. Normally the quantity of phthalic acid present will be very small and at least a part of this will be washed from the condenser walls by the liquid phthalic anhydride. Hence only an occasional heating up to around say 200° C. is necessary to effect its removal.

After decomposition of phthalic acid in condenser 6 or after melting of phthalic anhydride is completed, when the phthalic acid decomposition step is not employed, the temperature of the condenser ordinarily will be too high to immediately effect satisfactory cooling of the gases and condensation of phthalic anhydride. Accordingly it is preferred to pass partly cooled gases through this condenser and then through condenser 7 to complete the condensation. This may be accomplished by closing the valve on pipe 22 and opening the valves on branch 8 and conduit 4 so that gases from conduit 4 pass through condenser 6, thence up through conduit 20, and into condenser 7. Normal circulation of cooling water through condenser 6 is, of course, resumed during this step of the process.

After the temperature of the condenser 6 has been reduced to the desired extent, the valves on lines 8, 18, and 20 are closed and the valves on lines 17 and 21 are opened so that gases pass first through phthalic anhydride condenser 7 and then through condenser 6 and finally out at 19. Since the entire volume of gases from the converter now flows through preliminary cooler 2 and condenser 7, the additional cooling surface afforded by the series arrangement of condensers is advantageous. Furthermore, condenser 6, having just been cleaned, is at its maximum efficiency and serves to cool the gases more uniformly to the desired outlet temperature, say to 40° C., and to remove any phthalic anhydride which may yet be contained in the gases. This period may be continued until the efficiency of condenser 7 becomes appreciably impaired by accumulation of phthalic anhydride. When this state is reached, the condenser 7 is cleaned by duplicating the steps just enumerated with respect to condenser 6.

I claim:

1. In the recovery of phthalic anhydride from a hot reaction gas mixture of the type formed by the catalytic vapor phase oxidation of a polynuclear aromatic hydrocarbon, the steps which comprise passing a stream of the hot reaction gases through a condenser and cooling them therein to separate solid phthalic anhydride therefrom, continuing to pass said gas stream through the condenser as aforesaid until a substantial quantity of solid phthalic anhydride is condensed therein, thereafter passing a stream of the hot reaction gases while yet at a temperature substantially above the melting point of phthalic anhydride through said condenser so as to liquefy solid phthalic anhydride contained therein, withdrawing the resultant liquid phthalic anhydride from the condenser, and withdrawing the partly cooled gases therefrom and further cooling them to separate phthalic anhydride.

2. In the recovery of phthalic anhydride from the hot reaction gases formed by the catalytic oxidation of a polynuclear aromatic hydrocarbon in vapor phase, the steps which comprise passing a stream of the hot reaction gases containing phthalic anhydride vapor through a condenser to cool the gases and separate solid phthalic anhydride therefrom, continuing to pass said hot gas stream containing phthalic anhydride vapor through the condenser until a substantial quantity of solid phthalic anhydride is condensed therein, then passing the major portion of the hot gas stream containing phthalic anhydride vapor into another condenser to separate solid phthalic anhydride therefrom, passing a portion of the hot gas stream containing phthalic anhydride vapor through said first-mentioned condenser at a temperature above the melting point of phthalic anhydride so as to liquefy solid phthalic anhydride contained therein, withdrawing the resultant liquid phthalic anhydride from the condenser, and passing the partly cooled gases therefrom into the other condenser to effect further cooling thereof and separation of solid phthalic anhydride therefrom.

3. In the recovery of phthalic anhydride from hot reaction gases formed by the catalytic oxidation of naphthalene in vapor phase by means of air, the method which comprises condensing phthalic anhydride alternately in two condensers wherein the cycle of operations for each condenser comprises the steps of passing a stream of the hot reaction gases through a cooler to cool the gases to a temperature just above the melting point of phthalic anhydride, passing the cooled gas stream through a condenser to separate solid phthalic anhydride therefrom, continuing to pass said gas stream through the condenser until a substantial quantity of solid phthalic anhydride has accumulated therein, then passing the gas stream from said cooler through a second condenser to separate solid phthalic anhydride therefrom, passing a portion of the hot reaction gas stream, without passage through said cooler, through the first-mentioned condenser at a temperature above the melting point of phthalic anhydride so as to liquefy solid phthalic anhydride contained therein, withdrawing the resultant liquid phthalic anhydride from the condenser, and passing the partly cooled gases into the second condenser to effect further cooling thereof and separation of solid phthalic anhydride therefrom.

WALTER H. KNISKERN.